(12) United States Patent
de Mersseman

(10) Patent No.: US 12,444,210 B2
(45) Date of Patent: Oct. 14, 2025

(54) DRIVER MONITORING SYSTEMS AND METHODS WITH COAXIAL CAMERA AND LIGHT SOURCE

(71) Applicant: VEONEER US LLC, Southfield, MI (US)

(72) Inventor: Bernard de Mersseman, Andover, MA (US)

( * ) Notice: Subject to any disclaimer, the term of this patent is extended or adjusted under 35 U.S.C. 154(b) by 426 days.

(21) Appl. No.: 17/961,127

(22) Filed: Oct. 6, 2022

(65) Prior Publication Data

US 2024/0127608 A1   Apr. 18, 2024

(51) Int. Cl.
*G06V 20/59*   (2022.01)
*G06T 7/70*   (2017.01)

(52) U.S. Cl.
CPC .............. *G06V 20/597* (2022.01); *G06T 7/70* (2017.01); *G06T 2207/10048* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 2008/0278516 A1* | 11/2008 | Santon | ................... | H04N 7/144 |
| | | | | 345/619 |
| 2016/0180143 A1* | 6/2016 | Horesh | ................ | G06V 40/193 |
| | | | | 348/44 |
| 2020/0198645 A1* | 6/2020 | Boer | ...................... | B60K 28/06 |
| 2021/0295073 A1* | 9/2021 | Yu | ........................... | A61B 5/746 |
| 2022/0148218 A1* | 5/2022 | Weitz | ................... | A61B 3/0025 |
| 2022/0324457 A1* | 10/2022 | Arora | .................... | B60W 40/08 |
| 2023/0190096 A1* | 6/2023 | Lee | ........................ | A61B 3/113 |
| | | | | 382/117 |

FOREIGN PATENT DOCUMENTS

JP      2012239849 A   * 12/2012

* cited by examiner

*Primary Examiner* — Jennifer Mehmood
*Assistant Examiner* — Promotto Tajrian Islam

(57) ABSTRACT

A driver monitoring system of a vehicle includes: an infrared (IR) camera configured to capture an image of a driver on a driver's seat within a passenger cabin of the vehicle; an IR light source that is disposed between the IR camera and the driver, that is optically coaxial with the IR camera, and that is configured to output IR light to the driver; a gaze module configured to determine a gaze of the driver based on the image from the IR camera; and a monitor module configured to determine whether a location where the gaze of the driver intersects a vertical plane in front of the driver is within an area on the vertical plane.

20 Claims, 11 Drawing Sheets

DRIVER MONITORING SYSTEMS AND METHODS WITH COAXIAL CAMERA AND LIGHT SOURCE

FIELD

The present disclosure relates to vehicle driver monitoring systems and methods and more particularly to driver monitoring systems and methods with coaxially aligned driver monitoring cameras and light sources.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Driver monitoring systems of vehicles include a camera that faces the driver of a vehicle. Images from the camera are used during driving to monitor for alertness of the driver. Driver monitoring systems may also determine how actively the driver is paying attention to the environment in front of the vehicle.

The camera may be, for example, mounted on a steering wheel column of the vehicle or in another suitable location. Images from the camera may be used to monitor driver fatigue. When fatigue or a lack of attention of the driver is detected, the driver may be alerted.

SUMMARY

In a feature, a driver monitoring system of a vehicle includes: an infrared (IR) camera configured to capture an image of a driver on a driver's seat within a passenger cabin of the vehicle; an IR light source that is disposed between the IR camera and the driver, that is optically coaxial with the IR camera, and that is configured to output IR light to the driver; a gaze module configured to determine a gaze of the driver based on the image from the IR camera; and a monitor module configured to determine whether a location where the gaze of the driver intersects a vertical plane in front of the driver is within an area on the vertical plane.

In further features, the gaze module is configured to determine the gaze of the driver based on (a) a distance between the driver and the IR camera, (b) a location of a glint on a cornea of an eye of the driver in the image, (c) a dimension of pixels of the image, (d) a radius of the cornea of the driver, and (e) a focal length of the IR camera.

In further features, the gaze module is configured to determine the gaze of the driver using one of a lookup table and an equation that relates distances, locations, numbers of pixels, radii of corneas, and focal length to gaze.

In further features, the gaze module is configured to determine the gaze using the equation $$\alpha = \frac{Z}{r} * \frac{n * p_x}{F},$$

where $\alpha$ is the gaze of the driver, $Z$ is the distance between the driver and the IR camera, $n$ is the location of the glint from the IR light source on the cornea in the image, $p_x$ is the dimension of pixels, $r$ is the radius of the cornea, and $F$ is the focal length of the IR camera.

In further features, a distance module is configured to determine the distance between the driver and the IR camera based on the image.

In further features, a glint module is configured to determine, using the image, the location of the IR light from the IR light source and the number of pixels of the image occupied by the IR light from the IR light source.

In further features, the system further includes: a second IR camera configured to capture a second image of the driver on the driver's seat within the passenger cabin of the vehicle; and a second IR light source that is disposed between the second IR camera and the driver, that is optically coaxial with the second IR camera, and that is configured to output IR light to the driver, where the gaze module is configured to determine the gaze of the driver based on the image from the IR camera and the second image from the second IR camera.

In further features, an angle module is configured to determine, based on the image from the IR camera and the second image from the second IR camera: a first angle between (a) a first axis of the IR camera and (b) a first line between the IR camera and first light from the IR light source on an eye of the driver; a second angle between (a) a second axis of the second IR camera and (b) a second line between the second IR camera and second light from the second IR light source on the eye of the driver; a third angle between (a) the first axis and (b) a third line between a pupil of the eye and the IR camera; and a fourth angle between (a) the second axis and (b) a fourth line between the pupil and the second IR camera, where the gaze module is configured to determine the gaze of the driver based on the first, second, third, and fourth angles.

In further features, the gaze module is configured to determine the gaze of the driver using one of a lookup table and an equation that relates first, second, third, and fourth angles to gaze.

In further features, the gaze module is configured to determine the gaze of the driver based on the equation:

$$\tan\alpha = \frac{\tan\beta_2 . \tan\gamma_1 - \tan_2 . \tan_1}{\tan\gamma_1 - ta_2 - (\tan\beta_1 - \tan\beta_2)},$$

where tan denotes the tangent function, $\alpha$ is the gaze, the first angle is $\beta_1$, the second angle is $\beta_2$, the third angle is $\gamma_1$, and the fourth angle is $\gamma_2$.

In further features: the monitor module is configured to increment a timer value when the location where the gaze of the driver intersects the vertical plane in front of the driver is outside of the area on the vertical plane; and the driver monitoring system further includes an alert module configured to output an alert to the driver when the timer value is greater than a predetermined value.

In further features, the alert module is configured to at least one of: output a visual alert via one or more visual output devices; output an audible alert via one or more speakers; and output a haptic alert via one or more vibrating devices.

In further features, an action module is configured to, when the timer value is greater than a second predetermined value that is greater than the predetermined value, at least one of: apply brakes of the vehicle; decrease torque output of a propulsion device; and adjust steering of the vehicle.

In further features, the monitor module is configured to: based on the gaze of the driver, monitor alertness of the driver; and selectively take an action based on the alertness of the driver.

In a feature, a driver monitoring method for a vehicle includes: using an infrared (IR) camera, capturing an image of a driver on a driver's seat within a passenger cabin of the vehicle; using an IR light source that is disposed between the IR camera and the driver and that is optically coaxial with the IR camera, outputting IR light to the driver; determining a gaze of the driver based on the image from the IR camera; and determining whether a location where the gaze of the driver intersects a vertical plane in front of the driver is within an area on the vertical plane.

In further features, determining the gaze includes determining the gaze of the driver based on (a) a distance between the driver and the IR camera, (b) a location of a glint on a cornea of an eye of the driver in the image, (c) a dimension of pixels of the image, (d) a radius of the cornea of the driver, and (e) a focal length of the IR camera.

In further features, determining the gaze includes determining the gaze of the driver using one of a lookup table and an equation that relates distances, locations, numbers of pixels, radii of corneas, and focal length to gaze.

In further features, the method further includes determining the distance between the driver and the IR camera based on the image.

In further features, the method further includes, using the image, the location of the IR light from the IR light source and the number of pixels of the image occupied by the IR light from the IR light source.

In further features, the method further includes: using a second IR camera, capturing a second image of the driver on the driver's seat within the passenger cabin of the vehicle; and using a second IR light source that is disposed between the second IR camera and the driver and that is optically coaxial with the second IR camera, outputting IR light to the driver, where determining the gaze includes determining the gaze of the driver based on the image from the IR camera and the second image from the second IR camera.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is an example image of a human captured using the camera while the light source is on;

In the drawings, reference numbers may be reused to identify similar and/or identical elements.

DETAILED DESCRIPTION

Driver monitoring systems (DMS) of vehicles determine whether a gaze of a driver of a vehicle is within an area to determine whether the driver's attention is on the road in front of the vehicle. The gaze of the driver is determined using an infrared (IR) light source and an IR camera, such as a near IR camera. The IR light source and the IR camera could be disposed separated from one another. To determine the gaze of the driver, a multi-variable system of non-linear equations may be solved iteratively based on assumptions and individually calibrated parameters, such as corneal curvature, eye diameter, etc.

The present application involves the IR light source being coaxially aligned with the IR camera. The IR light source is disposed on the optical axis of the IR camera. The coaxial alignment of the IR light source and the IR camera reduces assumptions and calibrations and reduces uncertainties related to eye geometry (e.g., cornea radius, eyeball diameter), increases accuracy of the gaze determination, and increases computational efficiency of determining the gaze of the driver.

In various implementations, two IR cameras with coaxially aligned IR light sources may be used. This may further reduce the number of variables used to determine the gaze of the driver relative to using only one IR camera with a coaxially aligned light source. This also further increases computational efficiency of determining the gaze of the driver and accuracy of the gaze determination.

Figure 1:
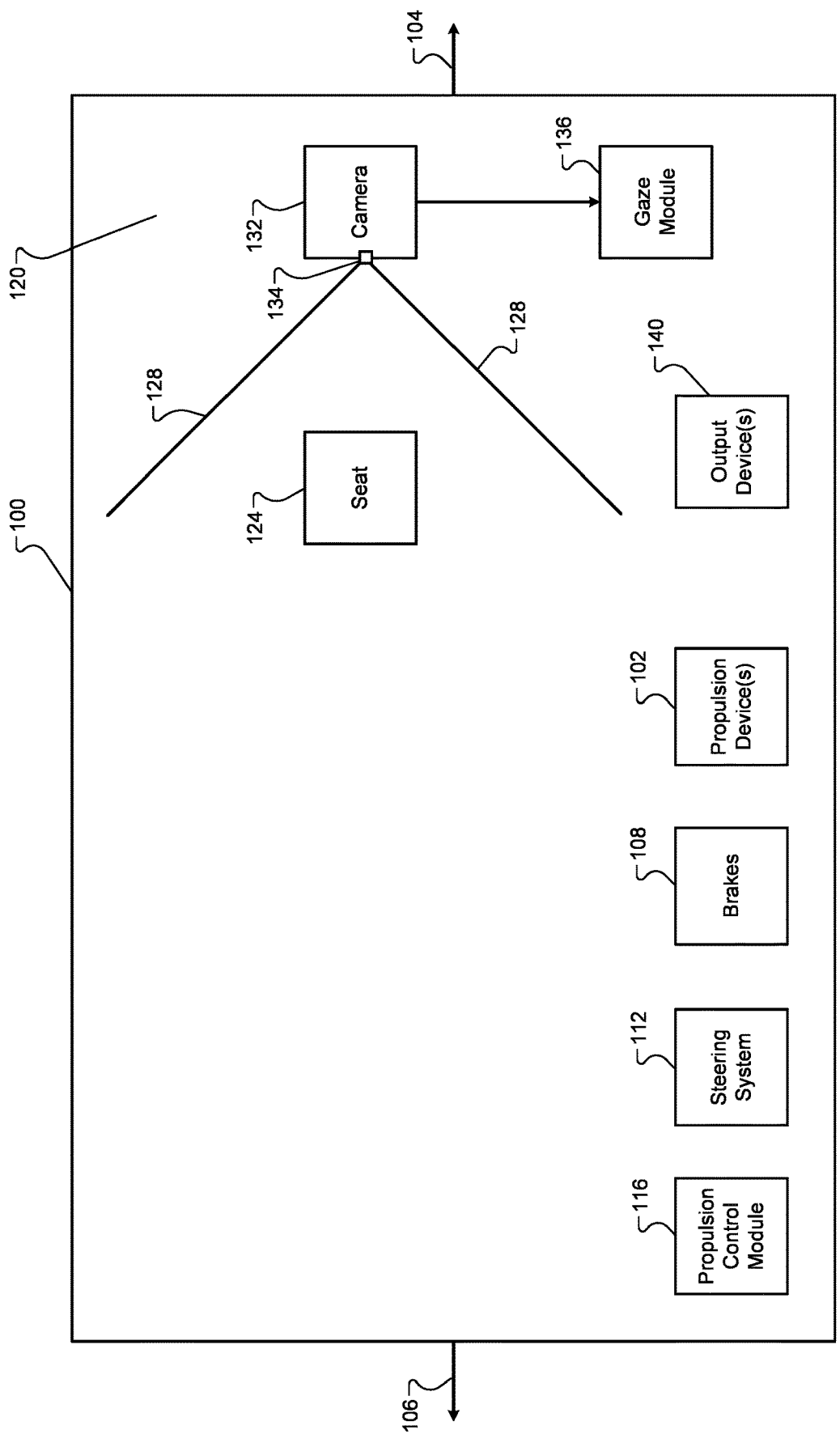
FIG. 1 is a functional block diagram of an example implementation of a vehicle.

FIG. 1 is a functional block diagram of an example vehicle 100 including one or more propulsion devices. The vehicle 100 may be a conventional vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices 102, such as at least one of an electric motor and an internal combustion engine, that generate propulsion torque that is used to propel the vehicle 100. Forward and backward directions of the vehicle 100 are illustrated by arrows 104 and 106. The vehicle 100 includes mechanical (friction) brakes 108 that decelerate the vehicle 100 when actuated. The vehicle 100 includes a steering system 112 that steers the vehicle 100 when actuated. The steering system 112 may be, for example, an electric power steering system or another suitable type of steering system.

A propulsion control module 116 controls the steering system 112, the brakes 108, and the propulsion device(s) 102. The propulsion control module 116 may control positive torque output from the propulsion device(s) 102 based on at least one of (a) an accelerator pedal position and (b) autonomous or semiautonomous driving input. The propulsion control module 116 may control actuation of the brakes 108 based on at least one of (a) a brake pedal position and (b) autonomous or semiautonomous driving input. The propulsion control module 116 may control actuation of the steering system 112 based on at least one of (a) a steering wheel angle and (b) autonomous or semiautonomous driving input. For example, the propulsion control module 116 may actuate the steering system 112 to maintain the vehicle 100 between lane lines of a present lane.

The vehicle 100 includes a passenger cabin 120. A driver's seat 124 is disposed within the passenger cabin 120. While only the driver's seat 124 is shown for simplicity, one or more additional seats may also be disposed within the passenger cabin 120.

The driver's seat 124 is disposed within a field of view (FOV) 128 of a camera 132. While an example horizontal FOV is shown, the FOV 128 may be greater than or lesser than the example FOV shown. Because the driver's seat 124 is disposed within the FOV 128, a portion of a driver (at least including eyes of the driver) sitting on the driver's seat 124 is captured in images captured by the camera 132.

The camera 132 is an infrared (IR) camera such as a near IR camera. The IR wavelength of the camera 132 may be between 850 nanometers (nm) and 1700 nm, such as 940 nm, 1350 nm, 1550 nm, or another suitable IR wavelength. An IR light source 134, such as a near IR light source, outputs IR light onto eyes of the driver. In addition to capturing the driver, the camera 132 captures the IR light output by the IR light source 134. As discussed further below, the IR light source 134 is arranged coaxially with the camera 132.

A gaze module 136 identifies eyes of the driver and pupils of the eyes, respectively. The gaze module 136 determines a gaze indicating a direction of the pupils of the driver based on the light output by the IR light source 134 captured in an image from the camera 132. The gaze is used to determine whether the driver is looking within a driver monitoring system (DMS) area while the vehicle is moving in the forward direction. The DMS area is an area on a vertical plane in front of the vehicle 100.

Figure 2:
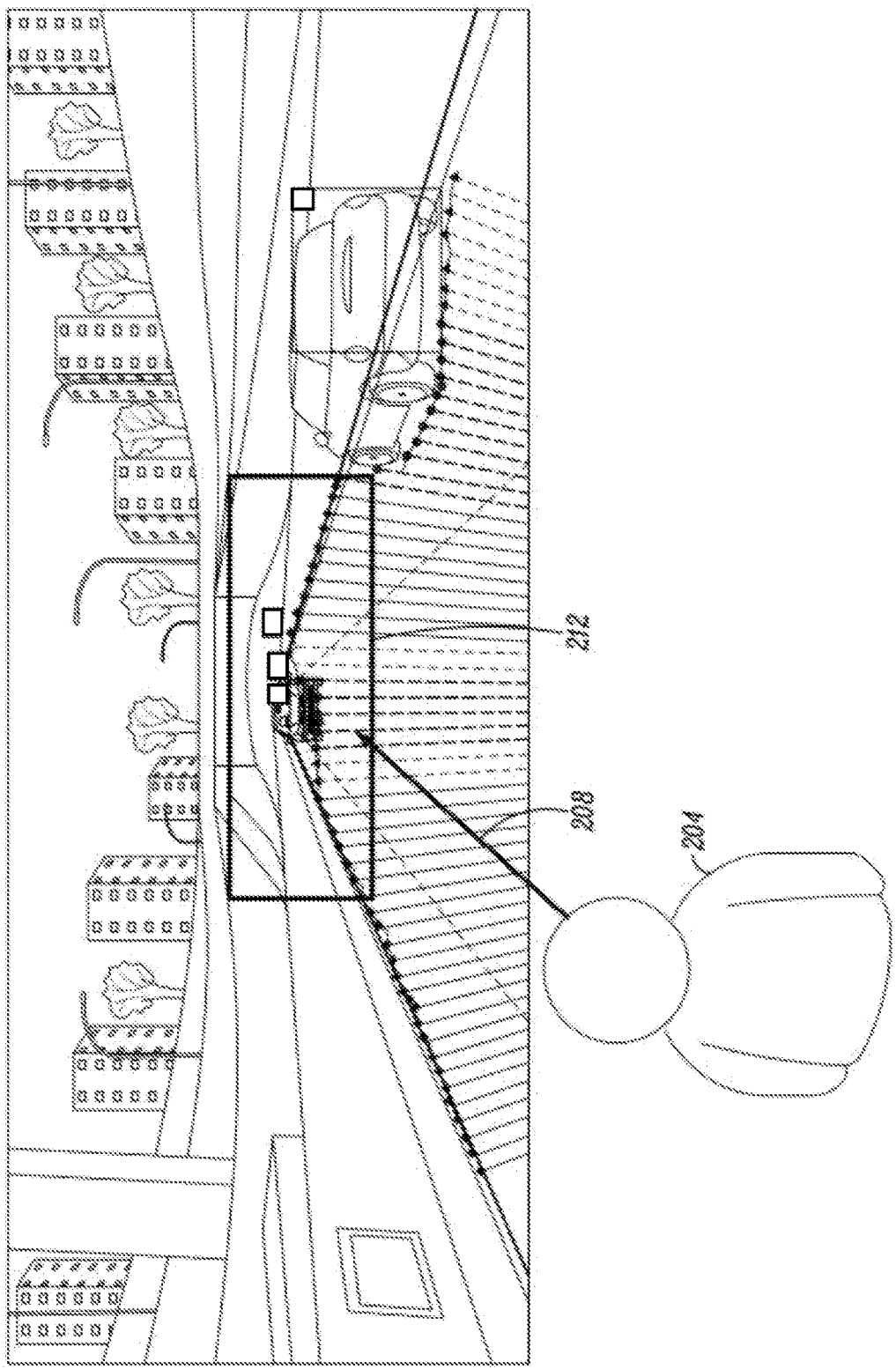
FIG. 2 includes an example illustration of a driver and a gaze of the driver and an area.

FIG. 2 includes an example illustration of a driver 204 and a gaze (e.g., angle) 208 determined by the gaze module 136. An example DMS area 212 is illustrated. In the example of FIG. 2, the gaze 208 intersects the DMS area 212. The gaze of the driver 204 is therefore within the DMS area 212. The gaze of the driver 204 being outside of the DMS area may indicate that the driver is not monitoring the road in front of the vehicle.

One or more actions may be taken when the gaze of the driver 204 is outside of the DMS area for a first predetermined period. For example, one or more outputs may be generated by one or more output devices 140 (FIG. 1). For example, one or more visual outputs may be visually output via one or more visual output devices (e.g., displays, lights, indicators, etc.). Additionally or alternatively, one or more audible outputs may be audibly output via one or more speakers. Additionally or alternatively, the one or more haptic outputs may be output via one or more vibrating devices (e.g., in steering wheel, in seat, etc.). When the gaze of the driver is outside of the DMS area for a second predetermined period, one or more additional actions may be taken. For example, the propulsion control module 116 may at least one of decrease torque output of the propulsion device(s) 102, apply the brakes 108, and adjust the steering (e.g., to move the vehicle to a shoulder).

The DMS area may be a fixed or variable area on a vertical plane that is N units of distance (e.g., meters or feet) in front of (more forward than) the vehicle (e.g., the windshield). N may be an integer greater than or equal to zero.

Figure 3:
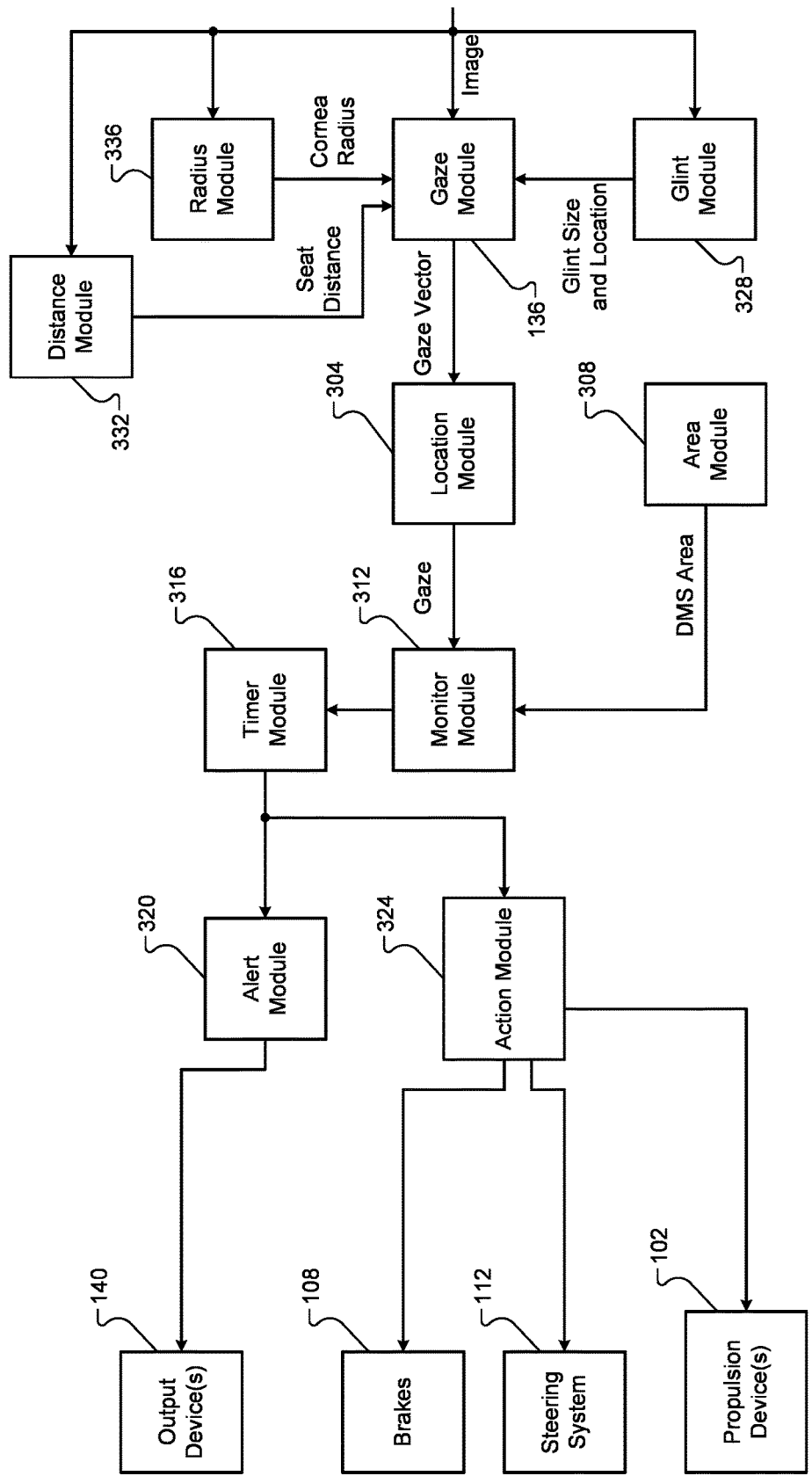
FIG. 3 is a functional block diagram of a driver monitoring system (DMS) of the vehicle.

FIG. 3 is a functional block diagram of a driver monitoring system (DMS) of the vehicle. The gaze module 136 determines the (present) gaze for the driver as discussed further below. A location module 304 determines the location (e.g., horizontal and vertical coordinates) of where the gaze of the driver intersects the vertical plane on which the DMS area lies. For example, the gaze may be used to generate a three dimensional linear equation, and the location may be determined by the location module 304 based on the gaze and the location of the vertical plane.

An area module 308 determines the DMS area on the vertical plane. The DMS area may be fixed or variable in location and/or size. The DMS area may be rectangular, such as in the example of FIG. 2.

A monitor module 312 determines whether the location where the gaze intersects the vertical plane of the DMS area is within the DMS area. When the location is within the DMS area, the monitor module 312 resets a timer value of a timer module 316. When the location is outside of the DMS area, the monitor module 312 increments the timer value (e.g., by 1). As such, the timer value tracks the period that the gaze of the driver has been outside of the DMS area. The monitor module 312 determines the awareness of the driver to potential hazards in the path (e.g., most probable) path of the vehicle, such as to alert the driver and/or take action to avoid a collision.

An alert module 320 outputs one or more alerts of inattention to the driver via the output device(s) 140 when the timer value is greater than a first predetermined value. In other words, the alert module 320 outputs one or more alerts to the driver when the period that the gaze of the driver has been outside of the DMS area is greater than a first predetermined period. The first predetermined period may be, for example, approximately 3 seconds or another suitable period.

An action module 324 may take one or more actions when the timer value is greater than a second predetermined value. In other words, the action module 324 may take one or more actions when the period that the gaze of the driver has been outside of the DMS area is greater than a second predetermined period. The second predetermined period is greater than the first predetermined period and may be, for example, approximately 6 seconds or another suitable period. For example, the action module 324 may at least one of (a) decrease torque output of the propulsion device(s) 102, (b) actuate (apply) the brakes 108, and (c) adjust steering of the vehicle 100.

Figure 4A:
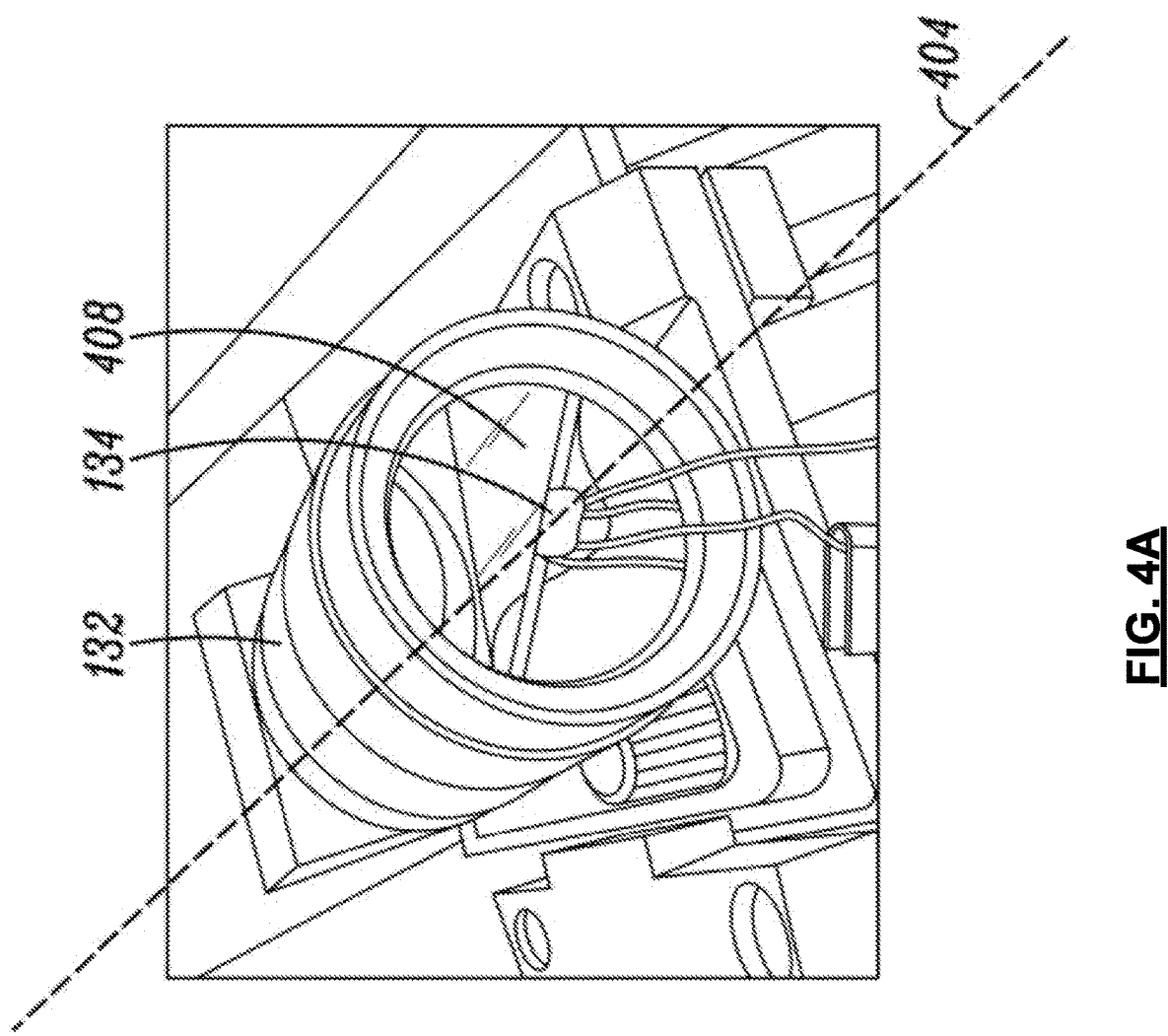
FIG. 4A includes a perspective view of an example implementation of the IR light source arranged coaxially with an axis of the camera.
Figure 4B:
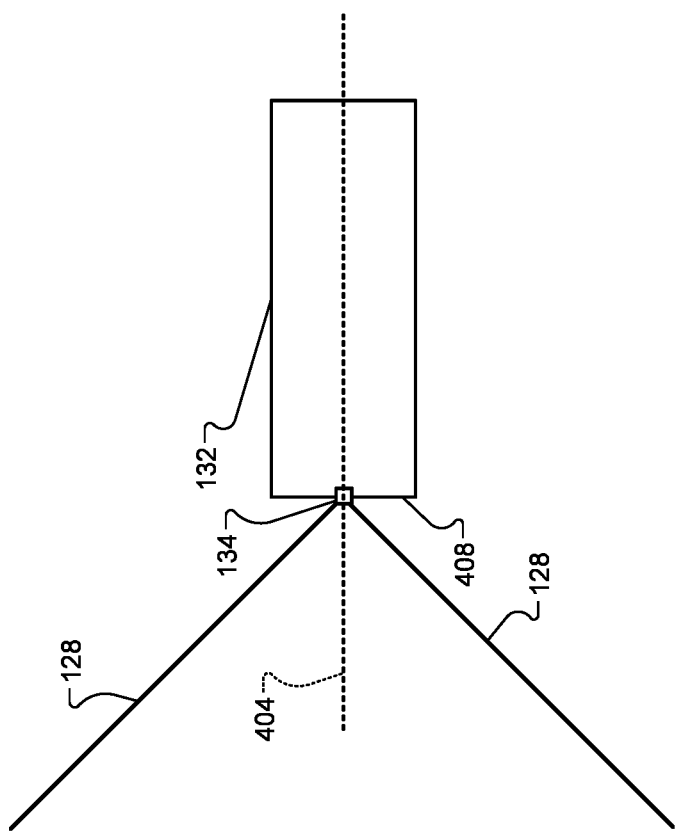
FIG. 4B includes an example side view of the camera and the IR light source arranged coaxially with the camera on the axis of the camera.

As discussed above, the IR light source 134 is coaxial with the camera 132. FIG. 4A includes a perspective view of an example implementation of the IR light source 134 arranged coaxially with an axis 404 of the camera 132. The IR light source 134 may be arranged between a lens 408 of the camera 132 and the driver. The IR light source 134 may be disposed outside of an outer surface of the lens 408. FIG. 4B includes an example side view of the camera 132 and the IR light source 134 arranged coaxially with the camera 132 on the axis 404 of the camera 132.

Figure 5:

FIG. 5 is an example image of a human captured using the camera 132 while the IR light source 134 is on. The IR light source 134 creates a spot, which may be referred to as a glint, on each eye of the driver. Example glints are illustrated by 504. The glint is the result of the specular reflection of the IR light source on the wet surface of the cornea.

Referring back to FIG. 3, a glint module 328 determines a location of a glint in an image captured by the camera 132 and a number of pixels of the image occupied by the glint. The glint module 328 may identify the glint, for example, based on the glint being the whitest (brightest) spot in the image or having another predetermined characteristic. The glint module 328 may determine the number of pixels of the glint, for example, by fitting a circle to the glint and determining the area (pixel wise) of the circle. The glint module 328 may set the location of the glint, for example, to the pixel (e.g., the coordinates) closest to the center of the circle. The gaze module 136 may identify the pupil, such as by recognizing a circular area having darker pixels than a surrounding area. The gaze module 136 may set the location of the center of the pupil, for example, to the pixel (e.g., the coordinates) closest to the center of the circle defining the pupil.

Figure 10:
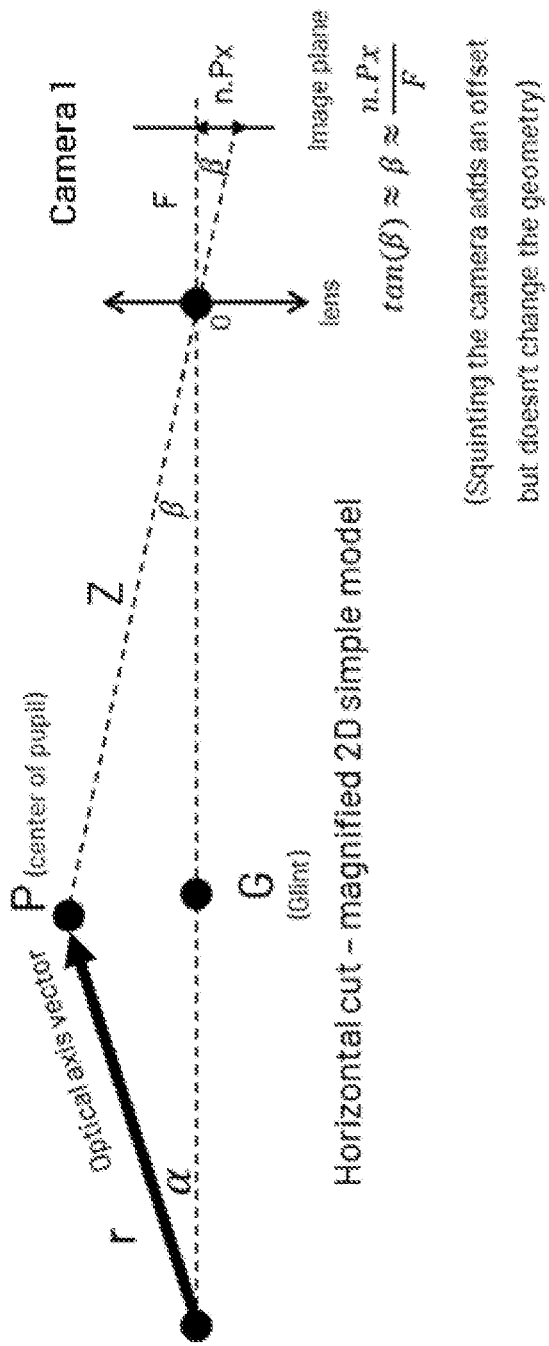
FIG. 10 includes an example schematic regarding determining gaze with one camera and one light source.

Referring also to FIG. 10, the gaze module 136 determines the gaze of the driver based on (a) a distance between the driver and the camera 132, (b) the location of the glint in the image, (c) the number of pixels of the glint, (d) a radius of the cornea of the driver, and (e) the predetermined focal length of the camera 132. The gaze module 136 determines the gaze using one of a lookup table and an equation that relates (a)-(e) to gaze. For example, the gaze module 136 may determine the gaze using the equation $$\alpha = \frac{Z}{r} * \frac{n * p_x}{F},$$

where $\alpha$ is the gaze (angle) of the driver, Z is the distance between the driver and the camera 132, n is the location of the glint relative to the center of the pupil (e.g., in number of pixels), $p_x$ is the predetermined dimension of a pixel of the imager array, r is the radius of the cornea, and F is the predetermined focal length of the camera 132.

Z, the distance between the driver and the camera 132 may be, for example, determined by a distance module 332 from the image. For example, the distance module 332 may determine the distance between the driver and the camera 132 based on a reflectivity of the skin of the driver, such as using one of a lookup table and an equation that relates reflectivities to distances. As another example, the distance module 332 may determine the distance between the driver and the camera 132 based on a position of the driver's seat 124, which may be measured using a position sensor.

r, the radius of the cornea may be a fixed predetermined value, such as set to be an average corneal radius of humans. In various implementations, a radius module 336 may determine the radius of the cornea based on the image. For example, the radius module 336 may identify the cornea in the image and fit a circle to the cornea. The radius module 336 may determine the radius of the circle to determine the radius of the cornea. In various implementations, squinting the IR camera may add an offset.

In various implementations, the gaze module 136 may determine the gaze of each eye of the driver as discussed herein. The gaze module 136 may determine a final gaze (input to the location module 304) based on the gazes of the eyes, respectively. For example, the gaze module 136 may set the gaze based on an average of the gazes of the eyes, respectively.

Figure 6:
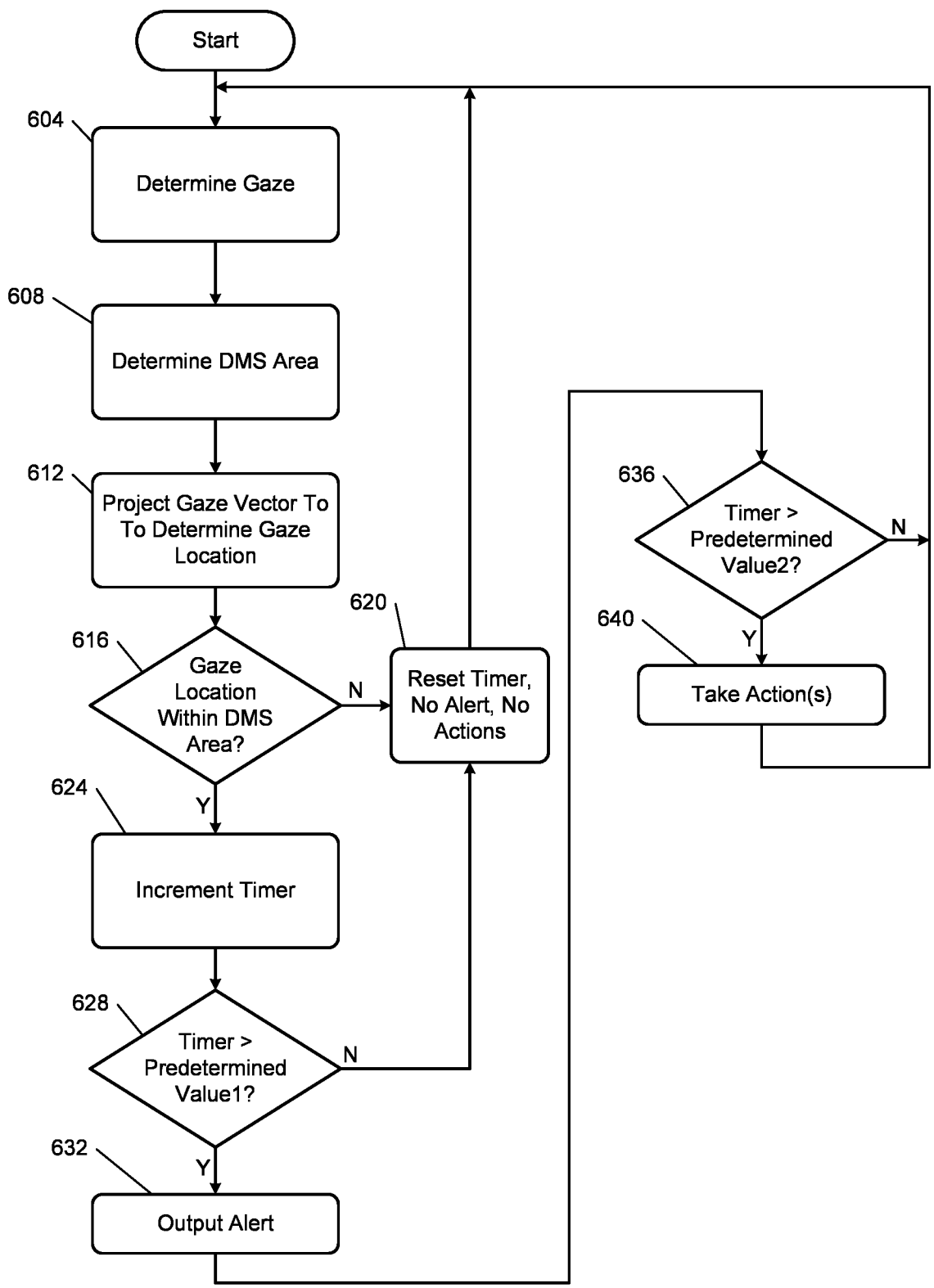
FIG. 6 is a flowchart depicting an example method of determining the gaze of the driver and selectively taking one or more actions.

FIG. 6 is a flowchart depicting an example method of determining the gaze of the driver and selectively taking one or more actions. Control begins with 604 when the vehicle 100 is moving in the forward direction. At 604, the gaze module 136 receives an image from the camera 132 and determines a gaze for the driver as discussed herein. For example, the gaze module 136 may determine the gaze as discussed above using the equation $$\alpha = \frac{Z}{r} * \frac{n * p_x}{F},$$

where $\alpha$ is the gaze (angle) of the driver, Z is the distance between the driver and the camera 132, n is the location of the glint, $p_x$ is the number of pixels occupied by the glint, r is the radius of the cornea, and F is the predetermined focal length of the camera 132. Alternatively, the gaze module 136 may determine the gaze as discussed below in the example of two cameras with two IR light sources that are coaxially aligned with the cameras, respectively.

At 608, the area module 308 determines the DMS area. At 612, the location module 304 determines the location where the gaze of the driver intersects the vertical plane of the DMS area. At 616, the monitor module 312 determines whether the location is within the DMS area. In other words, the monitor module 312 determines whether the gaze of the driver is within the DMS area. If 616 is false, the monitor module 312 resets the timer value (e.g., to zero) at 620. No alerts may be output and no actions may be taken at 620, and control returns to 604. If 616 is true, the monitor module 312 increments the timer value (e.g., by 1) at 624.

At 628, the alert module 320 determines whether the timer value is greater than the first predetermined value (Predetermined value 1). In other words, the alert module 320 determines whether the period since the driver's gaze left the DMS area is greater than the first predetermined period. If 628 is false, control transfers to 620, as discussed above. If 628 is true, control continues with 632.

At 632, the alert module 320 outputs one or more alerts via the output device(s) 140. This alerts the driver to the lack of attention to the road (the DMS area) in front of the vehicle 100. Control continues with 636.

At 636, the action module 324 determines whether the timer value is greater than the first predetermined value (Predetermined value 2). In other words, the action module 324 determines whether the period since the driver's gaze left the DMS area is greater than the second predetermined period. In various implementations, attention of the driver to potential hazards is monitored. If 636 is false, control returns to 604 for a next set of images. If 636 is true, the action module 324 takes one or more actions at 640, such as at least one of decreasing torque output of the propulsion device(s) 102, applying the brakes 108, and steering the vehicle 100. Control returns to 604 for a next set of images. The cameras may output images at a predetermined rate, such as 60 hertz (Hz) or another suitable rate.

Figure 7:
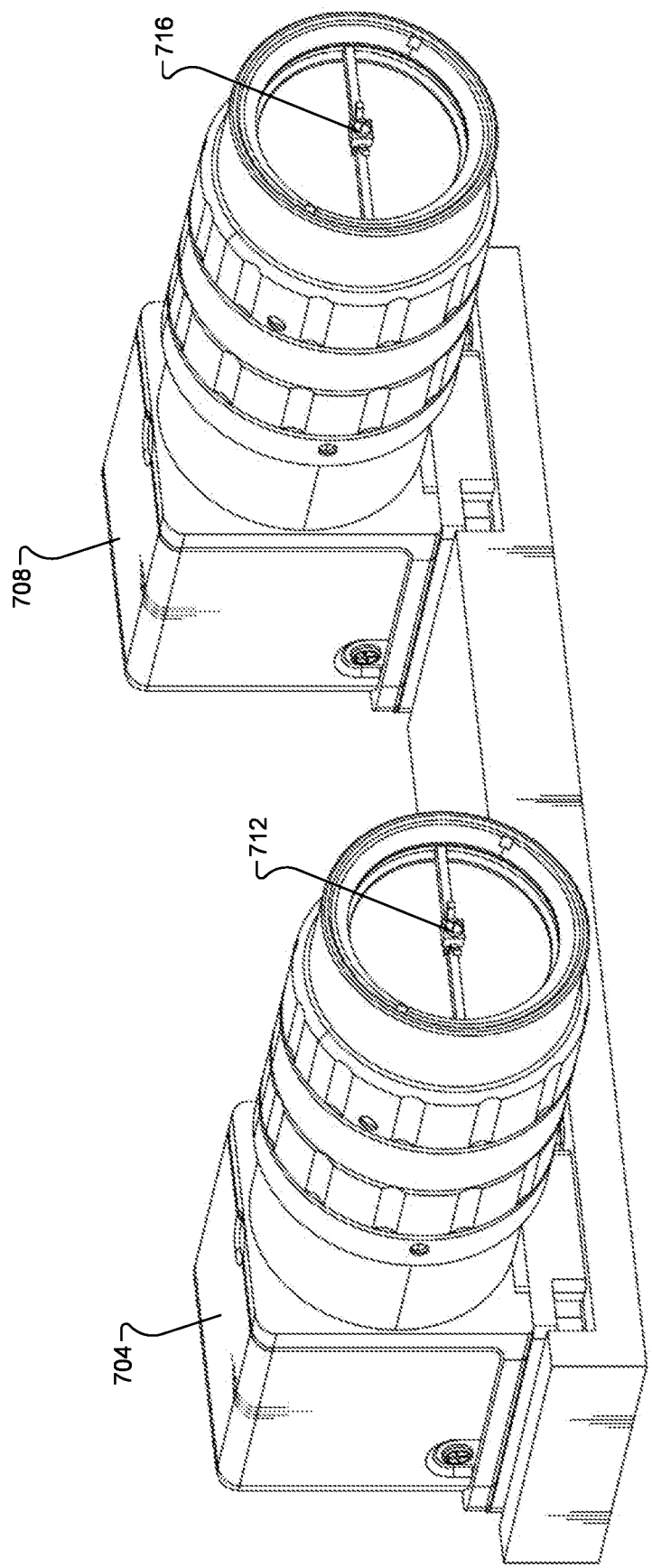
FIG. 7 is a perspective view of an example implementation of two cameras with two IR light sources that are coaxial with the two cameras, respectively.

FIG. 7 is a perspective view of an example implementation of two cameras 704 and 708 with two IR light sources 712 and 716 that are coaxial with the two cameras 704 and 708, respectively. In other words, the IR light sources 712 and 716 are disposed on the axes of the cameras 704 and 708, respectively. The IR light sources 712 and 716 output light in the same direction as the cameras 704 and 708 capture images.

Figure 8:
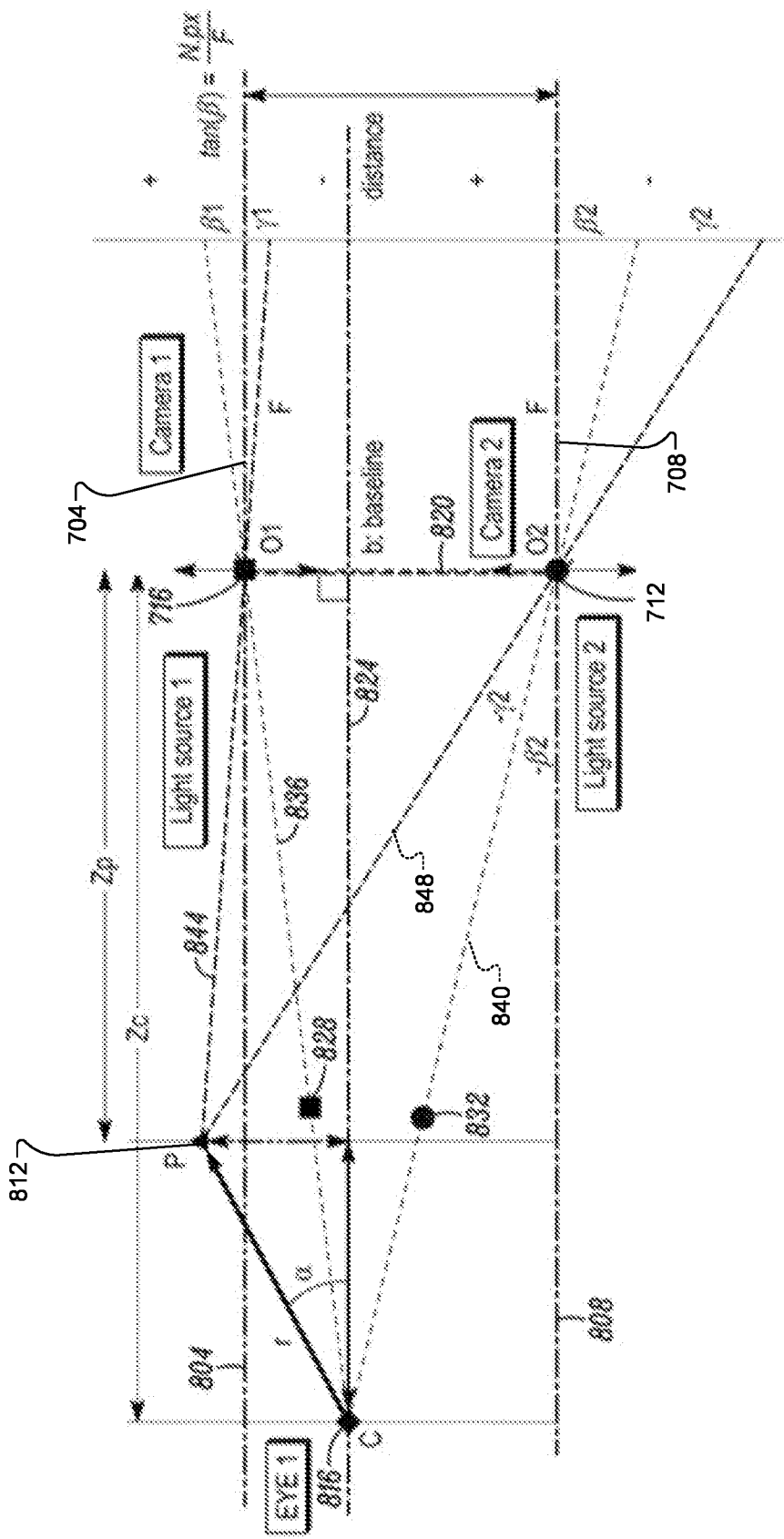
FIG. 8 includes an example schematic including the two cameras and the two light sources.

FIG. 8 includes an example schematic including the cameras 704 and 708 and the light sources 712 and 716. FIG. 8 is on the image plane of the cameras 704 and 708. As shown in FIGS. 7 and 8, the two cameras 704 and 708 are separated by a non-zero distance (distance in FIG. 8), and the axes of the cameras 704 and 708 (and the IR light sources 712 and 716) are parallel. The axis of the camera 704 and the IR light source 712 is illustrated by 804, and the axis of the camera 708 and the IR light source 716 is illustrated by 808.

P in FIG. 8 denotes the center of the pupil of the driver and is numbered 812, and C denotes the center of the cornea of the driver and is numbered 816. The two cameras 704 and 708 (e.g., centers) are disposed along a line 820 at a predetermined fixed distance apart from each other (e.g., 5 centimeters to 25 centimeters). To simplify the determination, line 824 extends through the cornea 816 and is perpendicular to the line 820, but the present application is also applicable to when the line 824 is not perpendicular to the line 820.

A first glint on the cornea of the driver from the first IR light source 712 is illustrated by 828. A second glint on the cornea of the driver from the second IR light source 716 is illustrated by 832. The angle $\alpha$ between the line 824 and a line between the center of the cornea 816 and the center of the pupil 812 defines the gaze vector of the driver.

Relative to the single camera and IR light source example, the gaze module 136 can determine the gaze a without the variables of the radius of the cornea (r), the distance to the driver (Z), and the pixel size of the glint ($p_x$). Instead, the gaze module 136 determines the gaze of the driver based on a first angle $\beta_1$, a second angle $\beta_2$, a third angle $\gamma_1$, a fourth angle $\gamma_2$.

The first angle $\beta_1$ is the angle between (a) the axis 804 of the first camera 704 (and the first light source 712) and (b) a line 836 between the first glint 828 and the first camera 704 (and the cornea 816). The second angle $\beta_2$ is the angle between (a) the axis 808 of the second camera 708 (and the second light source 716) and (b) a line 840 between the second glint 832 and the second camera 708 (and the cornea 816). The third angle $\gamma_1$ is the angle between (a) the axis 804 of the first camera 704 (and the first light source 712) and (b) a line 844 between the pupil 812 and the first camera 704. The fourth angle $\gamma_2$ is the angle between (a) the axis 808 of the second camera 708 (and the second light source 716) and (b) a line 848 between the pupil 812 and the second camera 708. Lines between items may be to centers of the items.

The gaze module 136 determines the gaze of the driver using one of an equation and a lookup table that relates first, second, third, and fourth angles to gaze. For example, the gaze module 136 may determine the gaze based on or using the equation:

$$\tan\alpha = \frac{\tan\beta_2.\tan\gamma_1 - \tan\gamma_2.\tan\beta_1}{\tan\gamma_1 - \tan\gamma_2 - (\tan\beta_1 - \tan\beta_2)},$$

where tan denotes the tangent function, the first angle is $\beta_1$, the second angle is $\beta_2$, the third angle is $\gamma_1$, and the fourth angle is $\gamma_2$. The gaze module 136 may determine the arc tangent function to determine the gaze. This equation derives from the 2 dimensional (2D) representation sketched in FIG. 8 where the gaze vector is in the same plane as the two cameras for sake of simplification of the equations. However, this discussion herein can be applied to a more general three dimensional (3D) context with no assumptions on the 3D gaze vector and position of the occupant.

The use of the two cameras 704 and 708 and the two IR sources 712 and 716 increases cost in the amount of the additional camera and light source. The use of two cameras, however, increases computational efficiency by requiring less computations to be performed and eliminates variables, thereby increasing accuracy of the gaze determination. The equation above is independent of the diameter of the eyeball or the diameter of the cornea, which are specific to each individual and may be a source of error.

Figure 9:
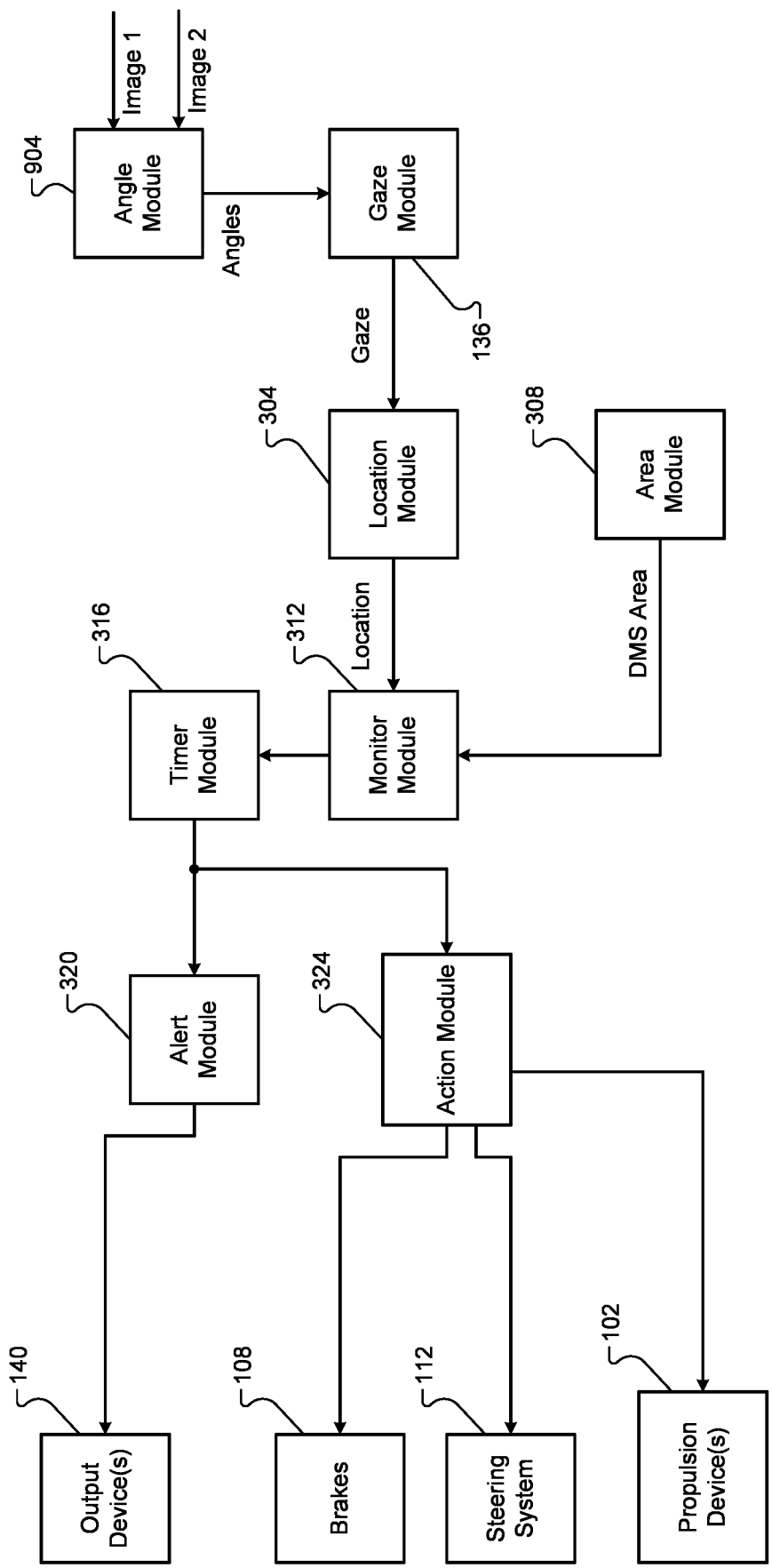
FIG. 9 is a functional block diagram of an example implementation of the driver monitoring system.

FIG. 9 is a functional block diagram of an example implementation of the driver monitoring system. In the example of FIG. 9, an angle module 904 determines the lines and the first, second, third, and fourth angles above from images from the cameras 704 and 708, respectively. The gaze module 136 determines the gaze based on the first, second, third, and fourth angles as discussed above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver monitoring system of a vehicle, comprising:
a first infrared (IR) camera configured to capture a first image of a driver on a driver's seat within a passenger cabin of the vehicle;
an IR light source that is disposed between the first IR camera and the driver, that is optically coaxial with the first IR camera, and that is configured to output IR light to the driver;
a gaze module configured to determine a gaze of the driver based on the first image from the first IR camera; and
a monitor module configured to determine whether a location where the gaze of the driver intersects a vertical plane in front of the driver is within an area on the vertical plane,
wherein the gaze module is configured to determine the gaze of the driver based on (a) a distance between the driver and the first IR camera, (b) a location of a glint on a cornea of an eye of the driver in the first image, (c) a dimension of pixels of the first image, (d) a radius of the cornea of the driver, and (e) a focal length of the first IR camera, and
wherein the gaze module is configured to determine the gaze using the equation $$\alpha = \frac{Z}{r} * \frac{n * p_x}{F},$$

where a is the gaze of the driver, Z is the distance between the driver and the first IR camera, n is the location of the glint from the IR light source on the cornea in the first image, $p_x$ is the dimension of pixels, r is the radius of the cornea, and F is the focal length of the first IR camera.

2. The driver monitoring system of claim 1 wherein the gaze module is configured to determine the gaze of the driver based on (a) a distance between the driver and the first IR camera, (b) a location of a glint on a cornea of an eye of the driver in the first image, (c) a dimension of pixels of the first image, (d) a radius of the cornea of the driver, and (e) a focal length of the first IR camera.

3. The driver monitoring system of claim 2 wherein the gaze module is configured to determine the gaze of the driver using one of a lookup table and an equation that relates distances, locations, numbers of pixels, radii of corneas, and focal length to gaze.

4. The driver monitoring system of claim 2 further comprising a distance module configured to determine the distance between the driver and the first IR camera based on the first image.

5. The driver monitoring system of claim 2 further comprising a glint module configured to determine, using the first image, the location of the IR light from the IR light source and the number of pixels of the first image occupied by the IR light from the IR light source.

6. The driver monitoring system of claim 1 further comprising:
a second IR camera configured to capture a second image of the driver on the driver's seat within the passenger cabin of the vehicle; and
a second IR light source that is disposed between the second IR camera and the driver, that is optically coaxial with the second IR camera, and that is configured to output IR light to the driver,
wherein the gaze module is configured to determine the gaze of the driver based on the first image from the first IR camera and the second image from the second IR camera.

7. The driver monitoring system of claim 6 further comprising an angle module configured to determine, based on the first image from the first IR camera and the second image from the second IR camera:
a first angle between (a) a first axis of the first IR camera and (b) a first line between the first IR camera and first light from the IR light source on an eye of the driver;
a second angle between (a) a second axis of the second IR camera and (b) a second line between the second IR camera and second light from the second IR light source on the eye of the driver;
a third angle between (a) the first axis and (b) a third line between a pupil of the eye and the first IR camera; and
a fourth angle between (a) the second axis and (b) a fourth line between the pupil and the second IR camera,
wherein the gaze module is configured to determine the gaze of the driver based on the first, second, third, and fourth angles.

8. The driver monitoring system of claim 7 wherein the gaze module is configured to determine the gaze of the driver using one of a lookup table and an equation that relates first, second, third, and fourth angles to gaze.

9. The driver monitoring system of claim 7 wherein the gaze module is configured to determine the gaze of the driver based on the equation:

$$\tan\alpha = \frac{\tan\beta_2.\tan\gamma_1 - \tan\gamma_2.\tan\beta_1}{\tan\gamma_1 - \tan\gamma_2 - (\tan\beta_1 - \tan\beta_2)}.$$

10. The driver monitoring system of claim 1 wherein:
the monitor module is configured to increment a timer value when the location where the gaze of the driver intersects the vertical plane in front of the driver is outside of the area on the vertical plane; and
the driver monitoring system further includes an alert module configured to output an alert to the driver when the timer value is greater than a predetermined value.

11. The driver monitoring system of claim 10 wherein the alert module is configured to at least one of:
output a visual alert via one or more visual output devices;
output an audible alert via one or more speakers; and
output a haptic alert via one or more vibrating devices.

12. The driver monitoring system of claim 10 further comprising an action module configured to, when the timer value is greater than a second predetermined value that is greater than the predetermined value, at least one of:
apply brakes of the vehicle;
decrease torque output of a propulsion device; and
adjust steering of the vehicle.

13. The driver monitoring system of claim 1 wherein the monitor module is configured to:
based on the gaze of the driver, monitor alertness of the driver; and
selectively take an action based on the alertness of the driver.

14. A driver monitoring method for a vehicle, comprising:
using a first infrared (IR) camera, capturing a first image of a driver on a driver's seat within a passenger cabin of the vehicle;
using an IR light source that is disposed between the first IR camera and the driver and that is optically coaxial with the first IR camera, outputting IR light to the driver;
determining a gaze of the driver based on the first image from the first IR camera; and
determining whether a location where the gaze of the driver intersects a vertical plane in front of the driver is within an area on the vertical plane,
wherein determining the gaze includes determining the gaze using the equation $$\alpha = \frac{Z}{r} * \frac{n * p_x}{F},$$

where $\alpha$ is the gaze of the driver, Z is the distance between the driver and the first IR camera, n is the location of the glint from the IR light source on the cornea in the first image, $p_x$ is the dimension of pixels, r is the radius of the cornea, and F is the focal length of the first IR camera.

15. The driver monitoring method of claim 14 wherein determining the gaze includes determining the gaze of the driver based on (a) a distance between the driver and the first IR camera, (b) a location of a glint on a cornea of an eye of the driver in the first image, (c) a dimension of pixels of the first image, (d) a radius of the cornea of the driver, and (e) a focal length of the first IR camera.

16. The driver monitoring method of claim 15 wherein determining the gaze includes determining the gaze of the driver using one of a lookup table and an equation that relates distances, locations, numbers of pixels, radii of corneas, and focal length to gaze.

17. The driver monitoring method of claim 15 further comprising determining the distance between the driver and the first IR camera based on the first image.

18. The driver monitoring method of claim 15 further comprising determining, using the first image, the location of the IR light from the IR light source and the number of pixels of the first image occupied by the IR light from the IR light source.

19. The driver monitoring method of claim 14 further comprising:
using a second IR camera, capturing a second image of the driver on the driver's seat within the passenger cabin of the vehicle; and using a second IR light source that is disposed between the second IR camera and the driver and that is optically coaxial with the second IR camera, outputting IR light to the driver, wherein determining the gaze includes determining the gaze of the driver based on the first image from the first IR camera and the second image from the second IR camera.

20. A driver monitoring system of a vehicle, comprising:
a first infrared (IR) camera configured to capture a first image of a driver on a driver's seat within a passenger cabin of the vehicle;
an IR light source that is disposed between the first IR camera and the driver, that is optically coaxial with the first IR camera, and that is configured to output IR light to the driver;
a gaze module configured to determine a gaze of the driver based on the first image from the first IR camera;
a monitor module configured to determine whether a location where the gaze of the driver intersects a vertical plane in front of the driver is within an area on the vertical plane;
a second IR camera configured to capture a second image of the driver on the driver's seat within the passenger cabin of the vehicle;
a second IR light source that is disposed between the second IR camera and the driver, that is optically coaxial with the second IR camera, and that is configured to output IR light to the driver, wherein the gaze module is configured to determine the gaze of the driver based on the first image from the first IR camera and the second image from the second IR camera; and an angle module configured to determine, based on the first image from the first IR camera and the second image from the second IR camera:
a first angle between (a) a first axis of the first IR camera and (b) a first line between the first IR camera and first light from the IR light source on an eye of the driver;
a second angle between (a) a second axis of the second IR camera and (b) a second line between the second IR camera and second light from the second IR light source on the eye of the driver;
a third angle between (a) the first axis and (b) a third line between a pupil of the eye and the first IR camera; and
a fourth angle between (a) the second axis and (b) a fourth line between the pupil and the second IR camera, wherein the gaze module is configured to determine the gaze of the driver based on the first, second, third, and fourth angles.

* * * * *